(12) United States Patent
Green et al.

(10) Patent No.: US 6,729,996 B2
(45) Date of Patent: May 4, 2004

(54) FIELD RESPONSIVE FLUIDS FOR LUBRICATION AND POWER TRANSMISSION

(75) Inventors: Louis Green, Fountain Hills, AZ (US); Leonid Charles Lev, West Bloomfield, MI (US); Dexter Dean Snyder, Birmingham, MI (US)

(73) Assignee: General Motors Corporation, Detroit, MI (US)

( * ) Notice: Subject to any disclaimer, the term of this patent is extended or adjusted under 35 U.S.C. 154(b) by 100 days.

(21) Appl. No.: 10/132,583

(22) Filed: Apr. 25, 2002

(65) Prior Publication Data

US 2003/0203788 A1 Oct. 30, 2003

(51) Int. Cl.⁷ .......................... F16H 15/01; F16H 55/32
(52) U.S. Cl. ................................ 476/7; 476/8
(58) Field of Search ..................... 476/7, 8, 39, 40; 384/133; 192/21.5

(56) References Cited

U.S. PATENT DOCUMENTS

| | | | |
|---|---|---|---|
| 3,977,739 A | | 8/1976 | Moskowitz et al. |
| 4,444,298 A | * | 4/1984 | Stangroom ................. 192/21.5 |
| 5,469,947 A | * | 11/1995 | Anzai et al. ............... 192/21.5 |
| 5,607,372 A | | 3/1997 | Lohr |
| 5,845,753 A | | 12/1998 | Bansbach |
| 5,967,273 A | * | 10/1999 | Hampton ................... 192/21.5 |
| 6,162,144 A | | 12/2000 | Haka |
| 6,183,386 B1 | * | 2/2001 | Duggan ....................... 475/84 |
| 6,471,618 B2 | * | 10/2002 | Pavlov et al. ................. 476/52 |

* cited by examiner

*Primary Examiner*—David Fenstermacher
(74) *Attorney, Agent, or Firm*—Kathryn A. Marra

(57) ABSTRACT

A transmission device that includes a driving member and a driven member in frictional engagement with the driving member. A traction fluid is included at a contact between the driving and driven members. The traction fluid is a field responsive fluid that is capable of changing its rheological properties in response to an external field.

17 Claims, 2 Drawing Sheets

FIELD RESPONSIVE FLUIDS FOR LUBRICATION AND POWER TRANSMISSION

TECHNICAL FIELD

This invention relates to transmission devices utilized to transmit torque between driving and driven members, and more particularly to transmission devices including a field responsive fluid for increasing the amount of torque transferred.

BACKGROUND OF THE INVENTION

Field responsive fluids are capable of changing their properties when acted upon by an external field. In particular, field responsive fluids can exhibit dramatic changes in their rheological behavior in response to an external field. Typically, field responsive fluids demonstrate an increased viscosity when an external field is applied.

Field responsive fluids, as the term is utilized in this patent, include electro-rheological fluids, magneto-rheological fluids and ferro-fluids.

Ferro-fluids contain fine ferrite particles, usually of from 5 to 50 nanometers in size, suspended in a base fluid. The base fluid is usually a lubricant that can be mineral or synthetic oil, or a combination thereof including other additives. In the absence of a magnetic field, the properties of the ferro-fluid are the same as the properties of the base fluid without the ferrite particles. When a magnetic field is applied, the rheological properties of the ferro-field change dramatically, usually exhibiting an increased viscosity. Due to the small size of the ferrite particles, ferro-fluids can penetrate almost all lubricated contacts of a transmission device. Also, ferrite particles having the sizes outlined above are below the size of a single magnetic domain, such that the fluid does not retain the magnetic field and become a permanent magnet. Therefore, particles within the ferro-fluid exhibit magnetic properties only when they are in a magnetic field or they are acted upon by a magnetic field. When the field is removed, the magnetism affects are removed and the properties of the ferro-fluid return to the values characteristic of the base fluid itself. The ferrite particles do not coagulate to form agglomerates as may occur when utilizing a fluid having magnetic particles of a size larger than the size of a magnetic domain.

Traction drive continuously variable transmissions (TCVTs) are mechanisms known in the art to smoothly change the ratio of angular velocities of the engine and the wheels of a vehicle. The TCVT performs similar functions to that of a standard car (geared or stepped transmission) with the main difference being that the transmission ratio of the standard transmission is changed in steps due to the engagement of different sets of gears, while the TCVT allows changing this ratio smoothly and continuously without steps. The TCVT contains at least one pair of rolling elements that transmits the rotation from a car engine to the wheels. The rolling elements usually are installed with the ability to move either angularly or linearly or both with respect to each other. The change in the transmission ratio is achieved by moving one rolling element with respect to the other either linearly or angularly. A typical example of a TCVT design includes a cone shaped roller engaged with a toroidal shaped roller. In this arrangement, the rotational axis of the rollers are parallel and both rollers are enclosed in a jacket that is partially filled with a traction fluid. The toroidal shaped roller can slide along the axis of the cone-shaped roller resulting in a change of the contact radius of the cone-shaped roller. The transmission ratio is proportional to the ratio of the contact radii of the rollers such that a change in the contact radius results in a transmission ratio change.

Shear stress and torque is transmitted in a TCVT through a small contact patch between the rolling elements. If the deformations in contact between the two rolling bodies are neglected, the contact mathematically occurs in a single point. However, the bodies do naturally deform when in use and the theoretical contact point between them transforms into a contact patch. The dimensions and the pressure distribution within the contact patch are generally determined by Hertzian formulas, commonly known in the art [See, for example, K. L. Johnson, "Contact Mechanics", Cambridge University Press, N.Y., N.Y., 1989]. The contact forces are usually large while the area of contact is usually small. The resulting pressure in the contact patch area is very high with common pressures of up to 4 gigapascals. The rolling elements, as described above, are partially submerged in a standard transmission fluid which is drawn into the contact patch. Under the very high contact pressure, the fluid is partially squeezed out between the contact surfaces leaving a thin continuous fluid film separating the two rolling bodies.

When one of the rolling bodies is a driver, driving another rotating body, as is the case of a TCVT, a shear force through the contact patch transmits the torque. The thin fluid film described above separating the contacting bodies carries this shear force. Therefore, the torque that the TCVT can transmit is determined by the properties of this fluid film and is limited by the shear strength of the fluid in the contact patch. Therefore, it is desirable to utilize a fluid that has the highest shear strength and thus provides the transmission with the ability to transmit the highest torque with other properties being equal.

It is known in the art that under high pressure such as that between the pair of rollers, a fluid undergoes a phase transformation resulting in changes of its rheological properties. In particular, the viscosity of the fluid increases such that the fluid acquires some of the properties of a solid, such as the ability to transmit shear stress. Special fluids known in the art that provide large viscosity gain due to contact pressure have been developed for application in TCVT applications. However, known fluids cannot perform well at elevated temperatures such as 150° Centigrade which may develop in a transmission of a vehicle. The known fluids show a decrease in viscosity at elevated temperatures, resulting in a drop in the shear strength of the fluid. The resulting drop in shear strength leads to a drop in the amount of torque that may be transmitted by the transmission.

Mathematically, the ability of a fluid film to transmit shear stress is characterized by a traction coefficient, which is the ratio of the largest shear force that can be developed in the contact to the normal force in the same contact. The value of the traction coefficient is dependent upon the temperature, relative speeds of the elements, as well as other parameters. The best performing traction fluids known in the art usually exhibit a traction coefficient below 0.12 at ambient temperature with a resulting drop to below 0.06 at temperatures of 150° centigrade. There is, therefore, a need in the art to provide a traction fluid that shows an increase in the absolute value of the traction coefficient at elevated temperatures above 150° centigrade.

Geared transmissions may also benefit from the use of a field responsive fluid. Gears in a vehicle transmission are often subjected to large pressure acting on the teeth of the gears. Severe conditions of operation of a transmission often require high viscosity oil lubricants to prevent surface wear and fatigue. However, the presence of clutch devices within a geared transmission often limits the possible viscosity of transmission lubricants. Often, high viscosity lubricants may cause friction clutches, commonly utilized to engage various gears associated with the transmission, to slip. It is expensive and often not practical to utilize different fluids to lubricate different components of a transmission device such as clutches and gears. Such a design would require two separate fluid systems separated from each other but having redundant components.

Therefore, in an effort to improve the gear lubrication, a field responsive fluid, such as a ferro-fluid may be utilized to vary the rheological properties of the fluid such that the fluid may be utilized as a lubricant by a number of different components that require different rheological characteristics.

SUMMARY OF THE INVENTION

A transmission device including a driving member, and a driven member that is in frictional engagement with the driving member. A traction fluid is present at a contact between the driving and driven members. The traction fluid is a field responsive fluid that is capable of changing its rheological properties in response to an external field.

In one embodiment, the transmission device includes a driving and driven member in rotational frictional engagement, as commonly found in a continuously variable transmission. The transmission device of the first embodiment has the advantage of providing a transmission that is capable of transferring a higher torque than those utilizing conventional traction fluids.

The transmission device of the first embodiment has the further advantage of including a traction fluid that has a traction coefficient that is higher than that of conventional traction fluids at elevated temperatures.

In another embodiment the transmission device includes intermeshed gears comprising the driving and driven members. The transmission device of second embodiment has the further advantage of providing a device that provides increased lubrication of gears by locally increasing the viscosity of a transmission fluid. Also, the transmission device of the second embodiment has the advantage of utilizing a traction fluid that can vary its rheological characteristics to lubricate various components of the transmission device having different optimal rheological characteristics.

BRIEF DESCRIPTION OF THE DRAWINGS

These and other features and advantages of the present invention will become more readily appreciated when considered in connection with the following detailed description and appended drawings, where.

DESCRIPTION OF THE PREFERRED EMBODIMENTS

Figure 1:
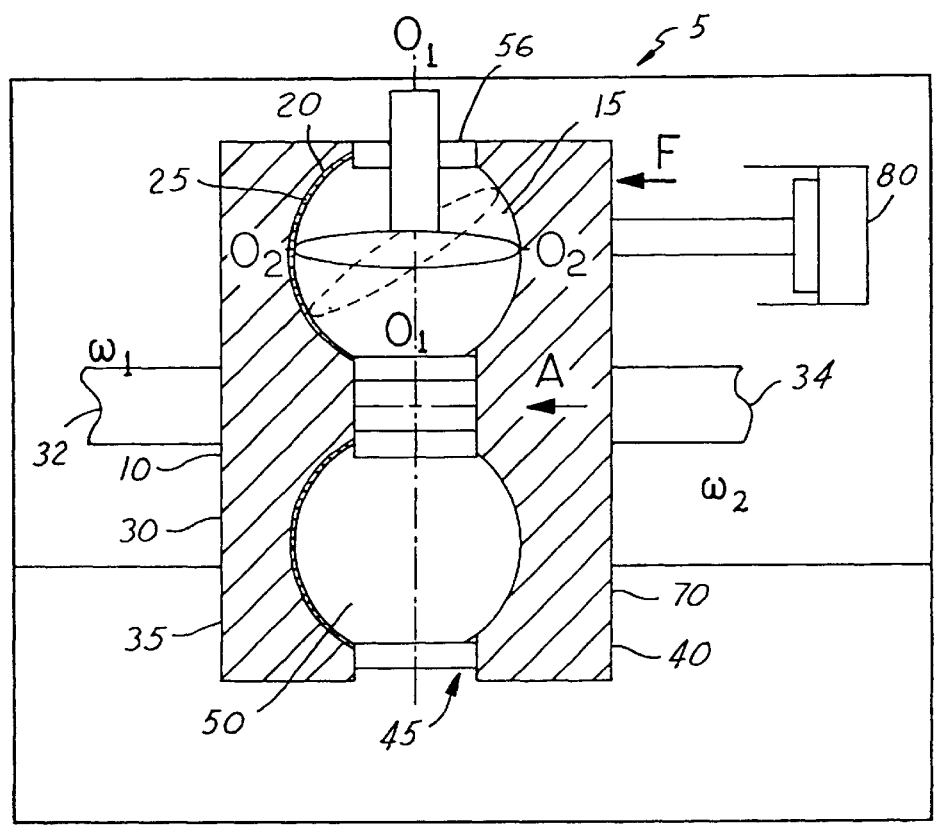
FIG. 1 is a diagram of a full toroidal traction drive utilized in a preferred embodiment of the present invention.

The transmission device 5 of the present invention includes a driving member 10 and a driven member 15 in frictional engagement with the driving member 10. A traction fluid 20 is present at a contact 25 between the driving 10 and driven 15 members. The traction fluid 20 is a field responsive fluid capable of changing its rheological properties in response to an external field.

With reference to FIG. 1, there is detailed a first embodiment of a transmission device according to the present invention. There is shown a power train system for a traction continuously variable transmission. The transmission device includes a traction device 30 having an input disk 35 and an output 40 disk that define a cavity 45. A roller element 50 is disposed within the cavity 45 and is in frictional engagement with the input 35 and output 40 disks. The input 35 and output 40 disks are coupled to input 32 and output 34 shafts for transmitting torque from the engine to the wheels. At least one of the input 35 and output 40 disks has the ability to move in the axial direction. With reference to FIG. 1, the output 40 disk is able to move in the direction of arrow A. The roller element 50 is supported inside the toroidal cavity by brackets 56 that allow the rolling element to spin around its axis $O_1$—$O_1$, and pivot around its axis $O_2$—$O_2$ as shown in phantom in FIG. 1, as well as move in the direction of the arrow A. As the rolling element pivots around its axis, the transmission ratio is modified, as is commonly known in the art. The entire mechanism of the TCVT is enclosed by a jacket 70 that is partially filled with the traction fluid 20 of the present invention.

A separate hydraulic mechanism 80 is used to press the output disk 40 in the direction of arrow A. As a result of the hydraulic mechanism, pressure is developed between the output disk 40 and the roller element 50, as well as between the rolling element 50 and the input disk 35. In this manner, torque from the engine is transmitted from the input disk 35 across the thin film of traction fluid 20 to the roller element 50 and across the thin film of traction fluid 20 to the output disk 40.

Preferably, the roller 50 is formed of a permanent magnetic material, such as 52100 stainless steel for exerting a magnetic fluid on the traction fluid 20; thereby, changing the rheological properties. Alternatively, the input 35 and output 40 disks may be formed of a permanent magnetic material. In lieu of forming an element of the transmission of a permanent magnetic material, a magnetic circuit may be coupled to either the roller 50 or input 35 and output 40 disks. The magnetic circuit would generate a localized magnetic field causing the fluid 20 to change its rheological properties.

The traction fluid 20 comprises a field responsive fluid including electro-rheological fluids, magneto-rheological fluids, and ferro-fluids. In a preferred embodiment, the traction fluid comprises a ferro-fluid including a base fluid having ferrite particles dispersed therein. According to a preferred embodiment of the invention, the traction fluid is obtained by dispersing ferro-magnetic particles in a commercially available traction fluid, such as Santotrack-2000 commercially available from Monsanto, Inc. The resulting fluid is a collodial suspension of magnetite ($Fe_3O_4$) particles with sizes ranging from 1 to 100 nanometers and even more preferably of from 5 to 50 nanometers.

Figure 3:
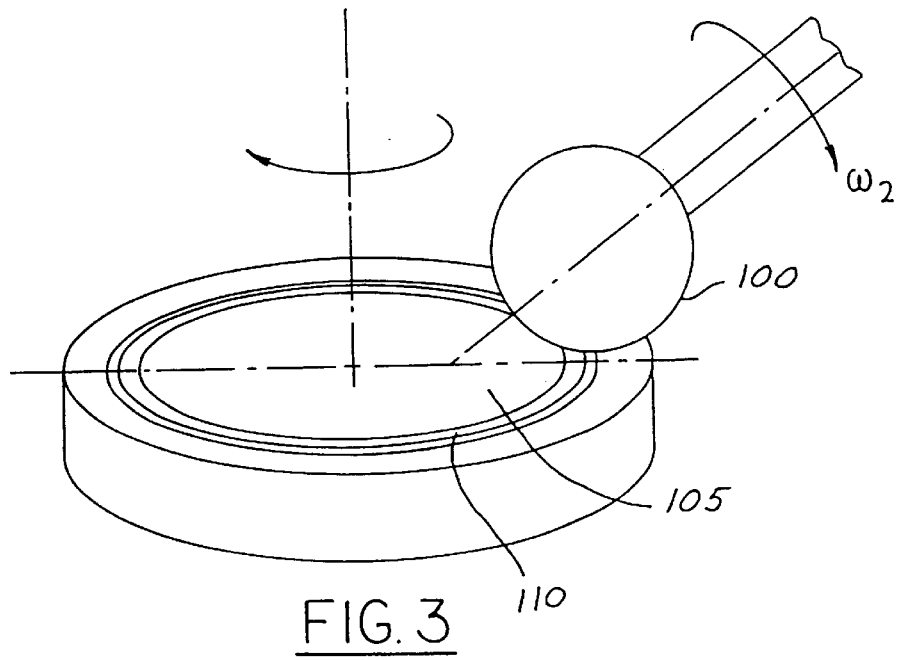
FIG. 3 is a diagram of a testing apparatus utilized to compare traction coefficients of various traction fluids at various temperatures.

Testing was preformed on the ferro-fluid of the present invention utilizing the arrangement as detailed in FIG. 3. With reference to FIG. 3, a spherical roller 100 was pressed against a flat disk 105 that includes a race 110 formed thereon. The spherical roller and the disk are preferably made of steel containing 1% carbon, 1.5% chromium, with the remainder iron and is commercially available as 52100 steel. The steel was heat-treated to a minimum hardness of 60 HR. The spherical roller was magnetized for exerting an external magnetic field. In the testing, the rollers were compressed with a force of 55 newtons resulting in contact stresses between the spherical roller and flat disk in excess of 1 gigapascal. The traction fluid was heated to various temperatures and a traction coefficient was measured between the roller 100 and disk 105 and plotted as a function of temperature.

The ferro-fluid utilized in the testing was formulated by combining a concentrated ferro-fluid NF878 commercially available from Ferro-Fluids Incorporated that has a 7.1% volume fraction of $Fe_3O_4$ particles dispersed therein. One part of the concentrated ferro-fluid was mixed with three-parts of traction oil Santotrack-2000. This ferro-fluid was placed within the testing apparatus and subjected to a magnetic field having a flux of 400 gauss that was supplied by a magnetic circuit coupled to the circle roller.

Figure 4:
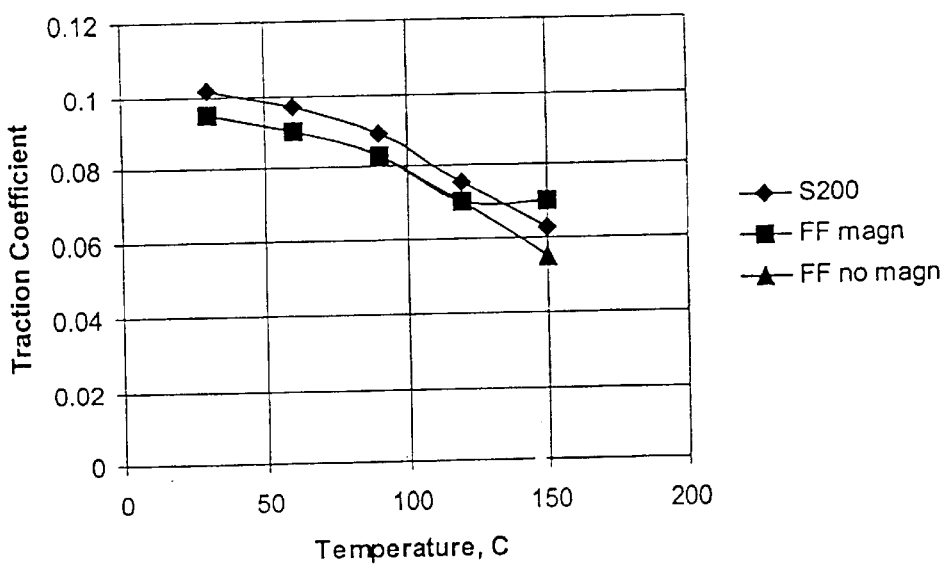
FIG. 4 is a figure detailing the results of testing showing the value of the traction coefficient of various fluids as a function of the temperature.

The results of the testing is detailed in FIG. 4 which shows a plot of the traction coefficient as a function of temperature for three different fluids including pure Santotrack-2000, a mixture of the concentrated ferro-fluid and Santotrack-2000 which is not subjected to a magnetic field, and a mixture of concentrated ferro-fluid and Santotrack-2000 which is subjected to a magnetic field. As is shown by the Figure, the shear strength of the traction fluid decreases with temperature as is reflected in the dropping traction coefficient. However, the traction coefficient of the ferro-fluid when tested with the magnetized roller does not exhibit a drop in traction coefficient at temperatures above 120° C. as is evident in the other two fluids tested. The resulting increase in the traction coefficient will allow a greater torque to be transferred by the transmission device at elevated temperatures.

Figure 2:
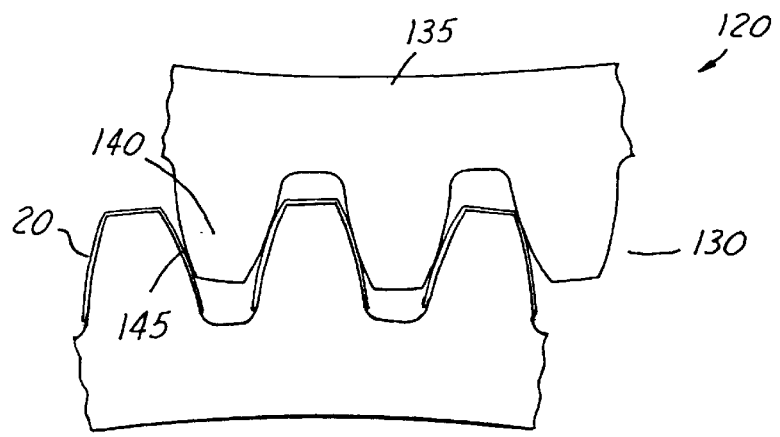
FIG. 2 is a graphical representation of two gears including a traction fluid of an alternative embodiment of the present invention.

According to a second embodiment of the present invention, there is shown in FIG. 2, a transmission device that includes a gear device 120 having at least a pair of gears 130 each of the gears having a body portion 135 with teeth 140 formed thereon. The gears are inter-engaged to transfer torque. A traction fluid 20 is in contact with the gear device at contact points 145 between the inter-engaged gears. The traction fluid 20 again comprises a field responsive fluid, and preferably a ferro-fluid as described above. The ferro-fluid is capable of changing its rheological properties in response to an external field wherein the viscosity of the traction fluid is increased to provide an increased lubrication between the gears and extend the service life of the gears.

Preferably the teeth portion 140 of the gears are either formed of a permanent magnetic material, or include a magnetic circuit coupled thereto for providing a localized magnetic field. The localized magnetic field causes the traction fluid to increase its viscosity between the teeth 140 of the inter-engaged gears thereby increasing the lubrication of the gears.

The transmission device of the second embodiment may include a clutch device (not shown) for engaging various pairs of gears within the transmission of an automobile. In such an arrangement, the traction fluid 20 utilized to lubricate the gears is also used to lubricate the clutch device. Generally, the viscosity of such a traction fluid is limited by the clutch device, as higher viscosity fluids may cause the clutch to slip. As an aspect of the second embodiment, a single traction fluid may be utilized, as a localized magnetic field can alter the rheological properties of the fluid for specific components of the transmission device. In this manner a single fluid for various components having different optimal rheological characteristics may be utilized.

While preferred embodiments are disclosed, a worker in this art would understand that various modifications would come within the scope of the invention. Thus, the following claims should be studied to determine the true scope and content of this invention.

What is claimed is:

1. A transmission device comprising:
    a driving member;
    a driven member in rolling contact and frictional engagement with the driving member;
    a traction fluid at a region of said rolling contact between the driving and driven members; and
    the traction fluid comprising a field responsive fluid capable of changing its rheological properties in response to a field and an electrical or magnetic field acting upon the field responsive fluid at the region of said rolling contact.

2. The transmission device of claim 1 wherein a viscosity of the traction fluid is increased when exposed to the external field to transmit a greater torque between the driving and driven members.

3. The transmission device of claim 1 wherein the field responsive fluid is selected from the group consisting of: magneto-rheological, electro-rheological, and ferro-fluids.

4. The transmission device of claim 1 wherein the traction fluid comprises a ferro-fluid.

5. The transmission device of claim 4 wherein the ferro-fluid comprises a base fluid having ferrite particles dispersed therein.

6. The transmission device of claim 5 wherein the ferrite particles have a particle size less than the size of a single magnetic domain.

7. The transmission device of claim 5 wherein the ferrite particles have a particle size of from 1 to 100 nanometers.

8. The transmission device of claim 7 wherein the ferrite particles have a particle size of from 5 to 50 nanometers.

9. The transmission device of claim 5 wherein the ferrite particles are present in an amount of from 2 to 10 percent by volume in relation to the base fluid.

10. The transmission device of claim 4 wherein at least one of the driving and driven members exerts a localized magnetic field upon the ferro-fluid at the region of said rolling contact.

11. The transmission device of claim 10 wherein at least one of the driving and driven members is formed of a permanent magnetic material.

12. The transmission device of claim 10 wherein at least one of the driving and driven members further includes a magnetic circuit for exerting a magnetic field upon the ferro-fluid.

13. The transmission device of claim 1 wherein the driving member comprises an input disk and the driven member comprises a roller element.

14. The transmission device of claim 1 wherein the driving and driven members comprise gears.

15. A transmission device comprising:
    a traction device having an input and an output disk defining a cavity;
    a roller element disposed in the cavity and in frictional engagement with the input and output disks;
    a traction fluid disposed within the cavity and forming a film between the input and output disks and the roller element, the traction fluid transmitting torque between the input and output disks and the roller element;

the traction fluid comprising a field responsive fluid capable of changing its rheological properties in response to an external field wherein a traction coefficient between the input and output disks and roller element is greater when compared to a non-field responsive traction fluid.

16. A transmission device comprising:

a geared device having at least a pair of gears, each of the gears having a body portion with teeth formed thereon, the gears being interengaged for transferring torque;

a traction fluid in contact with the geared device at a contact point between the interengaged gears;

the traction fluid comprising a field responsive fluid capable of changing its rheological properties in response to an external field and wherein a viscosity of the traction fluid is increased when exposed to the external field to provide an improved lubrication between the gears.

17. The transmission device of claim 16 wherein the traction fluid can vary its rheological properties corresponding to a magnitude of the external field thereby allowing a single traction fluid to be utilized as a lubricant by a plurality of components calling for different optimal rheological characteristics.

* * * * *